United States Patent [19]

Wüst

[11] 4,075,451
[45] Feb. 21, 1978

[54] BUTT WELDING APPARATUS

[75] Inventor: Toni Wüst, Cologne, Germany

[73] Assignee: Meyer, Roth & Pastor Maschinenfabrik GmbH, Cologne, Germany

[21] Appl. No.: 636,584

[22] Filed: Dec. 1, 1975

[30] Foreign Application Priority Data

Dec. 4, 1974 Germany .............................. 2457180

[51] Int. Cl.² ........................................... B23K 11/02
[52] U.S. Cl. .................................................. 219/51
[58] Field of Search ........................... 219/51, 52, 110

[56] References Cited

U.S. PATENT DOCUMENTS

| 2,239,114 | 4/1941 | Olmstead | 219/51 |
| 2,464,875 | 3/1949 | Lewis et al. | 219/51 |
| 3,350,533 | 10/1967 | Kleine-Weischede | 219/51 |

Primary Examiner—J. V. Truhe
Assistant Examiner—N. D. Herkamp
Attorney, Agent, or Firm—Spencer & Kaye

[57] ABSTRACT

In the electric butt welding of a workpiece having rod-like ends, a force measuring device senses the pressing force exerted on the workpiece by the upsetting tools. The welding current is started upon command from the force measuring device when the pressing force reaches a desired, preset value.

7 Claims, 4 Drawing Figures

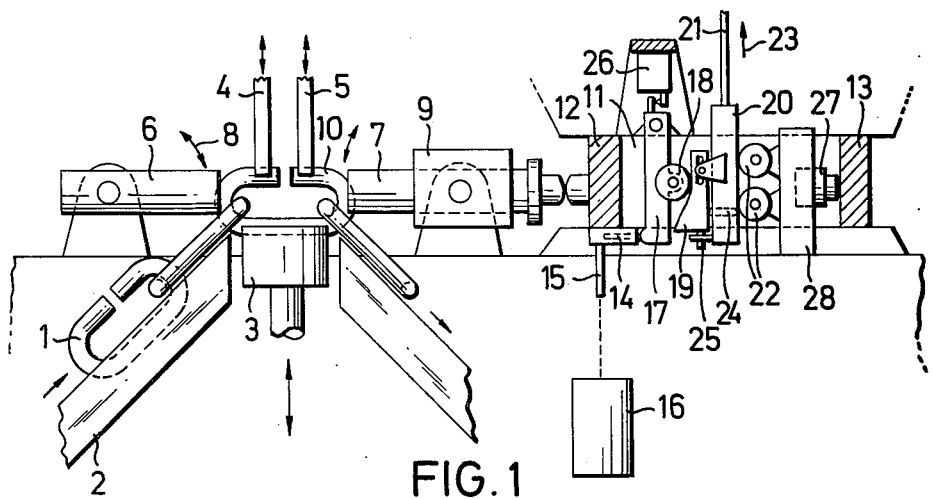
FIG. 1
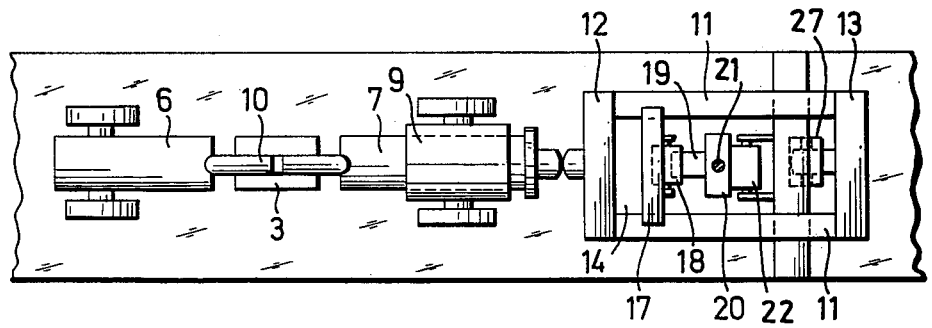
FIG. 2
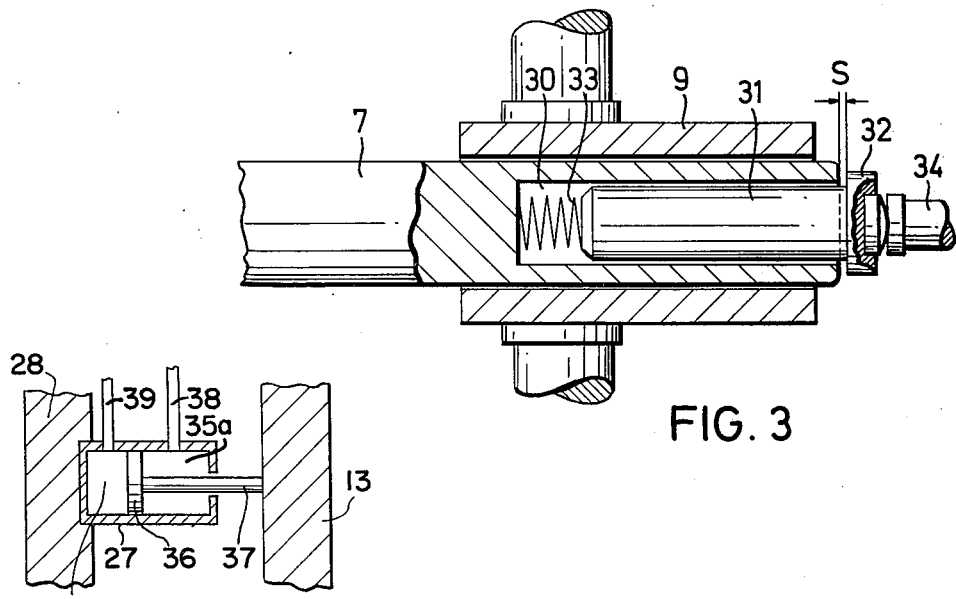
FIG. 3
FIG. 2a

BUTT WELDING APPARATUS

BACKGROUND OF THE INVENTION

This invention relates to a method and apparatus for the electric butt welding or flash butt welding of workpieces having rod-like ends. The invention is, in particular, concerned with the welding of the ends of chain links bent into C-shape on which there can be positioned electrodes and at least one positioning device which operates in the upsetting direction.

In welding machines known heretofore, particularly in welding machines for welding the ends of chain links bent into a C-shape, subsequent to the introduction of the chain link to be welded, the upsetting tools for holding and centering of the chain link have been advanced and thereupon, after a short delay, the electrodes were positioned on the two ends to be welded. Thereafter, at a moment fixedly preset in a control means, the welding current was turned on to carry out the welding program with the subsequent upsetting of the workpiece. This otherwise reliable process, however, fails to take into consideration the tolerances in the shape of the workpieces to be welded, particularly chain links bent into C-shape. It is precisely these tolerances, however, which, to a certain extent, may have an effect on the quality of the weld, particularly because upon starting the welding current, the pressure with which the faces to be welded are forced in engagement with one another, may significantly differ dependent upon the different shape deviations within the tolerance range.

SUMMARY OF THE INVENTION

It is an object of the invention to provide an improved method of the above-outlined type for further improving the quality of the weld seam.

This object and others to become apparent as the specification progresses, are accomplished by the invention, according to which, briefly stated, the pressing force with which the upsetting tools engage the workpiece is measured and, dependent upon a predeterminable pressing force, the welding current is started.

With the above-outlined process according to the invention, it is achieved that the welding current is started only when, independently from possible magnitude deviations, the faces to be welded are in engagement with one another and the faces are urged against one another with a pressing force that has reached a magnitude favorable for initiating the welding process. Since during the welding of chain links bent into C-shape and hooked into one another to form a continuous chain, the pressing force may practically always be maintained at a constant value, there will be obtained, for the entire chain, welds of practically identical quality.

According to a further feature of the method, the pressing force is measured by means of a hydropneumatically operating spring device. Since a hydropneumatically operating spring device can be biased to very high pressures, this method step has the advantage that upon positioning of the upsetting tools (of which expediently only one is displaceably supported while the other is affixed with the machine stand) a triggering of the spring device, as a function of the preset bias is effected only after the predetermined bias pressure is exceeded. Subsequently, however, the spring device has a flat spring characteristic which permits substantial displacements without a significant increase in the pressing force.

The welding machine structured according to the invention for performing the above method has at least two electrodes positionable on the workpiece to be welded and two upsetting tools for supporting the workpiece. At least one of the upsetting tools is displaceable in the upsetting direction. The welding machine is further provided with means for controlling the course of motion of the electrodes and the upsetting tools and for controlling the welding current as well as the upsetting mechanism actuating the upsetting tools. According to the invention, the control means effecting the course of motion of the displaceable upsetting tool controls the latter with the aid of a force measuring device in which a desired value may be set. The force measuring device is coupled to a switch for turning on the welding current. The force measuring device may be of mechanical structure; for example, it may comprise a spring element which has a predetermined spring characteristic. The component of the control means affecting the spring is coupled with the switch. The actuation of the switch may be effected mechanically or electrically by means of relay control. Instead of a spring, it is feasible to provide an electromechanically operating force measuring device such as pressure measuring boxes.

According to a particularly advantageous feature of the invention, the force measuring device has a piston-and-cylinder unit which is coupled with a hydropneumatically operating pressure accumulator. Advantageously, the bias pressure can be arbitrarily set in the pressure accumulator. This arrangement has the advantage that the force measuring device provides a practically rigid connection between the upsetting tool and the control means until the predetermined pressing force is reached and, upon reaching such a force, the piston-and-cylinder unit is compressed and thus a control signal is emitted for starting the welding current. The particular advantage of this arrangement resides primarily in the fact that even in the case of high bias pressures, the spring device formed by the hydropneumatic pressure accumulator has, after reaching the predetermined pressing force, a relatively flat spring characteristic so that relatively large switching paths are obtained without significantly increasing the pressing forces exerted on the workpiece by the upsetting tools.

According to a further feature of the invention, the upsetting tool is displaceably supported in a pivotal sleeve mounted on the machine frame and there is further provided a carriage which actuates the upsetting tool in the operational direction and which is displaceably mounted on the machine frame. The carriage is connected with the force measuring device and the associated components for controlling the course of motion of the upsetting tool and is further connected with the upsetting device. This arrangement is advantageous in that the pivotal motion of the upsetting tool simplifies the insertion of a new chain link to be welded, since by virtue of the pivotal displacement carriage is disconnected from the upsetting tool and there is provided a substantial free space for inserting the workpiece to be welded, without a substantial displacement of the carriage. By combining the force measuring device, the components of the motion control as well as the upsetting device on the carriage, there is obtained a structure which is very compact and which is very advantageous in view of the large forces to be applied.

According to a further feature of the invention the carriage has a frontal transverse yoke oriented towards the upsetting tool. The force measuring device is disposed in the frontal transverse yoke. The carriage further has a rear transverse yoke oriented away from the upsetting tool. The upsetting device is coupled to the rear transverse yoke. This arrangement is advantageous in that upon completion of the welding process, the upsetting device may become effective without exposing the force measuring device to a so-called "upsetting thrust".

According to a further feature of the invention, the force measuring device is coupled with a pressure roller which is in engagement with a contour cam driven by the control means for the course of motion of the upsetting tool. The pressure roller is supported in such a manner that it is displaceable relative to the machine frame.

According to still another feature of the invention, the pressure roller is mounted on a lever, one end of which is supported on the carriage and the other end of which is in engagement with the force measuring device. Further, a switch is connected with the lever for turning on the welding current. This arrangement is advantageous in that, as a function of the distance of the pressure roller from the point of engagement of the lever on the force measuring device, the lever advantage decreases as a function of the positioning force exerted on the measuring device. Thus, even in case of high pressing forces the force actually measured in the force measuring device may be set to a lesser value. Besides a reduction of the force to be measured, there is obtained, dependent upon the lever advantage, a corresponding increase of the switching path so that the switching can be effected in a more positive, reliable manner. With the lever there is connected a control switch which actuates a welding power contactor for switching on the high welding current.

According to a further feature of the invention, the contour cam is mounted on a carrier body in such a manner that it is pivotable and longitudinally displaceable and can further be immobilized by locking means. This arrangement is advantageous in that in addition to the fixedly predetermined course of the rotating contour cam with which the carrier body is moved, the contour cam mounted on the carrier body may be adjusted as a function of the desired moment for starting the course of motion of the upsetting tool (this adjustment is effected by longitudinal displacement of the contour cam) and as a function of the desired advancing speed of the upsetting tool (this adjustment is effected by a pivotal setting of the contour cam).

According to still another feature of the invention, the upsetting tool has, at that end which is supported in the pivotal sleeve, an opening in which a ram is guided, preferably coaxially, with the interposition of a spring element. The free end of the ram is oriented towards the carriage and has a collar for engaging the terminus of the upsetting tool. This arrangement ensures to an increased extent that the manufacturing tolerances of the workpieces, such as chain links bent in a C-shape, are taken into consideration. This is so because as the advance of the upsetting tool starts in response to the actuation by the contour cam, the upsetting tool is first positioned on the workpiece, and then, without further motion of the upsetting tool and thus the workpiece, the electrodes can be positioned on the workpiece while the carriage on which the contour cam is mounted, may further advance freely until the collar of the ram engages the upsetting tool whereupon the two free chain link ends are moved towards one another with increasing pressing force until the preset pressing force is obtained. By means of the interconnected sensor element it is achieved that the workpiece is firmly positioned on the saddle until the electrodes arrive into engagement. Since until the engagement of the collar of the ram on the upsetting tool the two free ends of the C-shaped chain link do not execute any relative motion, a wear of the electrode tips during positioning on the workpiece is avoided and further, a secure contact between the surfaces of the workpiece and the electrode tips is ensured.

BRIEF DESCRIPTION OF THE DRAWINGS

FIG. 1 is a side elevational view, partially in section, of a preferred embodiment of the invention.

FIG. 2 is a simplified top plan view of the embodiment shown in FIG. 1.

FIG. 2a is a schematic sectional side elevational view of a detail of FIG. 1.

FIG. 3 illustrates, on an enlarged scale, details of the displaceable upsetting tool.

DESCRIPTION OF THE PREFERRED EMBODIMENT

Turning now to FIG. 1, chain links 1 which are prebent into a C-shape and which are hooked in series to form a chain are brought, by means of a feeding mechanism 2 with the aid of a vertically movable saddle 3, in an edgewise upright orientation in the welding position under the welding electrodes 4 and 5. The chain link to be welded is held on the saddle 3 by pivotally supported upsetting tools 6 and 7, the operation of which will be explained in detail as the specification progresses. The structure of the feeding device, the saddle including its drive means, the pivotal arrangement of the upsetting tools as well as the drive mechanism for raising and lowering the electrodes 4 and 5 are conventional; their support on the machine frame is not illustrated. To the machine frame there is further connected a control device, for example, a throughgoing shaft carrying rotary cam discs, by means of which the course of motion of the electrodes and the saddle as well as the upsetting tool 7 is controlled in a predetermined, interdependent manner. This control too, is conventional and is therefore not illustrated for the sake of simplicity.

While the upsetting tool 6 is, with regard to the horizontal direction, rigidly supported on the machine frame and can merely pivot upwardly in the direction of the double-headed arrow 8 for receiving a chain link to be welded, the upsetting tool 7 is supported in a pivotally held sleeve 9 in such a manner that it is axially displaceable. As soon as a chain link 10 to be welded is brought into the welding position on the saddle 3, the upsetting tool 7 is first displaced with a small force to such an extent that the chain link 10 is held firmly on the saddle 3. Subsequently, the electrodes are positioned on the two free link ends of the chain link. It is to be understood that instead of two electrodes, as shown in this embodiment, two pliers-like electrode pairs may be used. After positioning the electrodes on the chain link, the upsetting tool 7 is further moved in an axial direction, so that the two free chain link ends arrive in mutual contact with their radial faces. During this operation, at a predetermined moment which is set by the control device, the current is started so that the welding, such as a flash butt welding, may take place. After interrupting the welding current, the chain link is exposed to a so-called "upsetting impact" by the upsetting tool 7, as a result of which the two chain link ends to be welded are pressed to one another.

In the welding machine according to the invention the upsetting tool 7 slidably held in the pivotal sleeve 9 is designed as a separate component which is exposed, in a force-transmitting manner, to the means for transmitting to motion in an axial direction. For transmitting the motion program to the upsetting tool 7, on the machine frame there is displaceably supported a carriage 11 which, in essence, comprises a frontal transverse yoke 12 and a rear transverse yoke 13. The two yokes 12 and 13 are rigidly connected to one another with lateral frame members. To the frontal transverse yoke 12 there is secured a force measuring device 14 which comprises, for example, a piston-and-cylinder unit coupled, by means of conduit 15, to a pressure accumulator 16 operating as a hydro-pneumatic spring. A lever 17 is, with one end, pivotally mounted on the carriage 11 and engages, with its other end, the piston of the piston-and-cylinder unit. Further, a roller 18 is supported on the lever 17. The roller 18 engages in a contour cam 19 which is mounted on a carrier body 20. The carrier body 20 is attached by means of a pull rod 21 with the control device of the welding machine. This control device comprises, for example, a rotary shaft carrying control cams. The carrier body 20 is in engagement with two rollers 22 which, in turn, are supported on a component forming part of the machine frame. If now the contour cam 19 is moved upwardly in the direction of the arrow 23 by means of the pull-rod 21, the entire carriage is moved by means of the pressure roller 18 in the direction of the chain link to be welded and in this manner the upsetting tool 7 is pressed against the chain link. The feeding speed is determined by the control device (not shown) which also effects the motion of the electrodes 4 and 5. In addition, by means of a set screw 24 in the carrier body 20, the inclination of the contour cam 19 may be set. Further, by means of a set screw 25 the precise start of the carriage feed and thus the motion of the upsetting tool may be regulated. The carriage and thus the upsetting tool are pressed with a predetermined speed against the chain link 10, whereby the two free chain link ends are pressed to one another at their radial faces without appreciable deformation. The pressing force generated during this operation is obtained, on the one hand, from the necessary deforming force and, on the other hand, from the higher reaction at the moment at which the two radial faces of the two link ends arrive into engagement in a still cold condition.

In conventional welding machines the moment when the welding current is started is fixedly preset so that dependent upon the unavoidable manufacturing tolerances related to the bending of the chain links to be welded, the pressing force prevailing at the moment of current start has varied from link to link so that, as a result, the quality of the weld was not uniform within the same chain.

In the welding machine according to the invention, the pressure roller 18 cooperating with the contour cam 19 is supported in the lever 17 which, with its free end, is in engagement with the piston-and-cylinder unit 14. By virtue of the preset bias of the hydro-pneumatic pressure accumulator 16, there is first obtained, during the first phase motion of the contour cam 19, a rigid connection between the pressure roller 18 and the carriage 11. At the moment, however, in which the preset bias pressure of the pressure accumulator 16 is reached, the piston 14 yields, so that for a short period of time the carriage 11 dwells in its earlier-assumed position while the contour cam is further moved, in accordance with the predetermined course of motion of the control device. The pneumatic component of the pressure accumulator 16 is so structured that the springing motion of the piston 14 corresponds to an engagement with a spring having a flat spring curve.

As a departure from the conventional welding machines, the lever 17 is connected with a switch 26 which is actuated only when the bias pressure of the pressure accumulator 16 is exceeded and the lever 17 is pivoted relative to the carriage 11. The switch 26 is connected with the current source for the electrodes 4 and 5, so that the welding current is, in contradistinction to prior art, not started by the control device at a fixedly predetermined moment, but it started only when a predetermined pressing force is present with which the radial faces of the link ends are urged into engagement with one another. As the welding process starts, the material begins to soften in the joint and then is converted into the liquid phase so that the material yields and thus the pressing force effected by the bias of the pressure accumulator 16 again lowers and thus the piston 14 is pushed back into its initial position. In this manner, between the further rotating contour cam 19, the pressure roller 18 and the carriage 11 there is reestablished a rigid connection and the carriage 11, according to the course of motion determined by the contour cam 19 and the other control components, moves the upsetting tool 7 against the chain link 10.

Upon interrupting the welding current which occurs automatically upon completion of a "current program", the electrodes 4 and 5 are lifted and the upsetting tool 7 is pressed in an impact-like manner against the chain link 10 by means of an upsetting device, formed conventionally of a hydraulic piston. In the presently described embodiment of the welding machine the hydraulic piston is coupled to the rear transverse yoke 13 of the carriage 11 and engages a component 27 which is rigidly connected to the port 28 of the machine frame. The particular advantage of this arrangement resides in the fact that upon indtoduction of the upsetting impact, the latter is not transmitted to the carriage 11 through the contour cam 19 and the pressure roller 18, but, upon effecting the upsetting impact, practically no forces prevail between the pressure roller 18 and the contour cam 19, so that the force measuring device formed of the lever 17, the pressure roller 18 and the piston-and-cylinder unit 14, together with the after-connected pressure accumulator 16, is not exposed to the upsetting impact since the latter is directly transmitted to the carriage 11.

The upsetting device referred to above is schematically illustrated in FIG. 2a. The component 27 which is affixed to the machine frame part 28 defines a double-acting hydraulic cylinder formed of cylinder chambers 35a and 35b separated by a piston 36 slidably received in the cylinder. The piston 36 has a piston rod 37 that projects from the double-acting cylinder and is attached to the rear transverse yoke 13. A pressurized medium may be introduced into and withdrawn from the cylinder chambers 35a and 35b through respective coupling nipples 38 and 39. For actuating the upsetting device, the cylinder chamber 35a is pressurized by introducing a pressure medium through the nipple 38. This pressure introduction is so effected that a rapid pressure build-up takes place in the cylinder chamber 35a so that the hydraulic piston 36 of the upsetting device and thus the entire carriage 11 (of which the transverse yoke 13 is a part) is rapidly moved to the left as viewed in FIG. 2a. In this manner the upsetting tool 7 is affected in an impact-like manner. Pressurization of the cylinder chamber 35b through the nipple 39 (with the simultaneous depressurization of the chamber 35a through the nipple 38) will effect a (limited) rightward movement of the carriage 11.

The structure of the upsetting tool 7 is illustrated in FIG. 3 in section and on an enlarged scale. As can be seen from the schematic illustration, the upsetting tool 7 is provided at its rear terminus with an opening 30 in which there is axially guided a ram 31 provided with a collar 32 at its rear terminus. At the base of the opening there is supported a spring element 33 which engages the ram 31. The spring element comprises, for example, a stack of disc springs held together as a unit, the bias of which may be set by means not shown. The rigidity and length of the spring stack are so designed that in the position of rest there is provided a clearance of predetermined magnitude between the terminus of the upsetting tool 7 and the collar 32. If now, in accordance with the feed determined by the contour cam 19 the carriage 11 (which in FIG. 3 is shown only by its pressure member 34 which may be, for example, a screw for the exact setting of distances) is pressed against the head of the ram 31, the upsetting tool 7 is first moved in the direction of the chain link 10 to be clamped. At the moment in which the upsetting tool 7 and the chain link 10 arrive into engagement, first the spring element 33 is compressed until the predetermined clearance between the collar 32 and the radial engagement face of the upsetting tool 7 is reduced to 0. The spring element 33 is so designed that the pressing force to which the chain link to be welded is exposed, is just sufficient to hold the chain link in the welding position for permitting the positioning of the welding electrodes. During the period in which the distance between the collar 32 and the rearward engagement face of the upsetting tool 7 is reduced to 0, the upsetting tool is stationary while the carriage 11 continues to move in accordance with the predetermined course of motion. In this respect the control device is so designed that during this short period the welding electrodes are placed in their operative position whereby it is ensured that during the positioning of the welding electrodes there can be no relative motion between the engagement faces of the electrodes and the chain link to be welded. Only after bridging the distance s does the upsetting tool fully follow the course of motion initiated by the carriage 11, until the pressing force predetermined by the force measuring device is reached.

It will be understood that the above description of the present invention is susceptible to various modifications, changes and adaptations, and the same are intended to be comprehended within the meaning and range of equivalents of the appended claims.

What is claimed is:

1. In an apparatus for the electric butt welding of a workpiece having rod-like ends; the apparatus including a machine frame; at least two welding electrodes; means for bringing the electrodes into contact with the workpiece; two upsetting tools for supporting the workpiece; means for movably supporting at least one of the upsetting tools to be displaceable in the upsetting direction; an upsetting device connected to and actuating the upsetting tools; a control means for controlling the course of motion of the electrodes and the upsetting tools and for controlling the welding current as well as the upsetting device; a force measuring device connected to the movable upsetting tool for sensing the pressing force exerted by the upsetting tool on the workpiece; means for setting a desired value of the pressing force; a switch coupled to the force measuring device to be actuated by the force measuring device when the desired value of the pressing force is reached; and a welding circuit including the switch for effecting the flow of welding current when the desired value of the pressing force is reached; the improvement wherein said means for movably supporting at least one of the upsetting tools includes a sleeve pivotally secured to the machine frame; said movable upsetting tool being slidably supported in said sleeve; a carriage displaceably supported on said machine frame; said control means including a force exerting means for urging said carriage against said movable upsetting tool for imparting a pressing force by said carriage on said movable upsetting tool when the latter is in an operational position; said carriage being connected with said upsetting device; said control means further including a force transmitting means connected to said force exerting means and said force measuring device; said force measuring device being connected to said carriage for applying thereto a force derived from the force exerted by said force exerting means to said force measuring device through said force transmitting means; said force measuring device being operatively connected to said switch for actuating said switch when the desired value of the pressing force is reached.

2. An apparatus as defined in claim 1, wherein the carriage has a frontal transverse yoke oriented towards said movable upsetting tool; said force measuring device being arranged in said frontal yoke; said carriage further having a rear yoke oriented away from said movable upsetting tool; said rear yoke being coupled to said upsetting device for imparting an upsetting force by said upsetting device directly to said carriage with the circumvention of said force exerting means, said force transmitting means and said force measuring device.

3. An apparatus as defined in claim 1, wherein said force transmitting means includes a pressure roller coupled to said force measuring device; a contour cam driven by said control means; means for displaceably securing said contour cam to said machine frame; said pressure roller being in engagement with said contour cam.

4. An apparatus as defined in claim 3, further comprising a lever carrying said pressure roller; said lever having one end supported on said carriage and another end being in engagement with said force measuring device; said lever being operatively connected to said switch.

5. An apparatus as defined in claim 3, further comprising a carrier body longitudinally and pivotally displaceably supporting said contour cam and adjusting means mounted on said carrier body for adjusting said contour cam with respect to said carrier body.

6. An apparatus as defined in claim 1, wherein said movable upsetting tool has an end within said sleeve; further comprising means defining an opening in said end of said tool; a ram slidably supported in said opening, said ram having a free end oriented towards said carriage; a spring element disposed in said opening for exerting a force on said ram; and a collar provided on said free end of said ram for engaging an end of said movable upsetting tool.

7. An apparatus as defined in claim 1, said force transmitting means comprising a force transmitting member mounted on said carriage and being displaceable relative to said carriage; said force transmitting member being coupled to said switch for actuating said switch in the course of the displacement of said force transmitting member relative to said carriage; said force measuring device being mounted on said carriage and being in contact with said force transmitting member; said force transmitting member and said force measuring device transmitting said pressing force of said force exerting means to said carriage for urging said carriage against said movable upsetting tool; said force measuring device including yieldable means for immobilizing said force transmitting member on said carriage as long as the pressing force transmitted from said force transmitting member to said force measuring device is below the desired value set in said force measuring device; said yieldable means effecting the displacement of said force transmitting member by said pressing force relative to said carriage when the pressing force transmitted from said force transmitting member to said force measuring device reaches said desired value.

* * * * *